(12) United States Patent
Yamasaki

(10) Patent No.: US 10,780,711 B2
(45) Date of Patent: Sep. 22, 2020

(54) DRAWING APPARATUS, METHOD OF DRAWING, AND RECORDING MEDIUM

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 88 days.

(21) Appl. No.: 15/902,989

(22) Filed: Feb. 22, 2018

(65) Prior Publication Data

US 2018/0272750 A1 Sep. 27, 2018

(30) Foreign Application Priority Data

Mar. 21, 2017 (JP) .................... 2017-054003

(51) Int. Cl.
```
B41J 3/407    (2006.01)
G06T 1/00     (2006.01)
G06T 3/00     (2006.01)
B41J 11/00    (2006.01)
F21K 99/00    (2016.01)
A45D 29/00    (2006.01)
```
(52) U.S. Cl.
CPC ............. *B41J 3/407* (2013.01); *B41J 11/008* (2013.01); *G06T 1/0007* (2013.01); *G06T 3/00* (2013.01); *A45D 2029/005* (2013.01); *F21K 2099/005* (2013.01)

(58) Field of Classification Search
None
See application file for complete search history.

(56) References Cited

U.S. PATENT DOCUMENTS

| 5,931,166 | A | 8/1999 | Weber et al. | |
|---|---|---|---|---|
| 6,067,996 | A * | 5/2000 | Weber ................ | A45D 34/04 132/200 |
| 6,286,517 | B1 | 9/2001 | Weber et al. | |
| 2014/0060560 | A1* | 3/2014 | Bitoh .................. | A45D 29/00 132/73 |
| 2014/0063084 | A1* | 3/2014 | Yamasaki ............ | B41J 3/407 347/3 |

FOREIGN PATENT DOCUMENTS

JP 2003534083 A 11/2003

* cited by examiner

*Primary Examiner* — Erica S Lin
(74) *Attorney, Agent, or Firm* — Holtz, Holtz & Volek PC

(57) ABSTRACT

A drawing apparatus includes a processor determining the aspect ratio of the surface area of a target nail of a finger or a toe, and entering a first fitting mode to modify the aspect ratio of at least one nail design in accordance with the surface area of the target nail and to fit the at least one nail design to the surface area of the nail. The rate of modification of the aspect ratio of the at least one nail design is within a modification threshold of the at least one nail design.

11 Claims, 6 Drawing Sheets

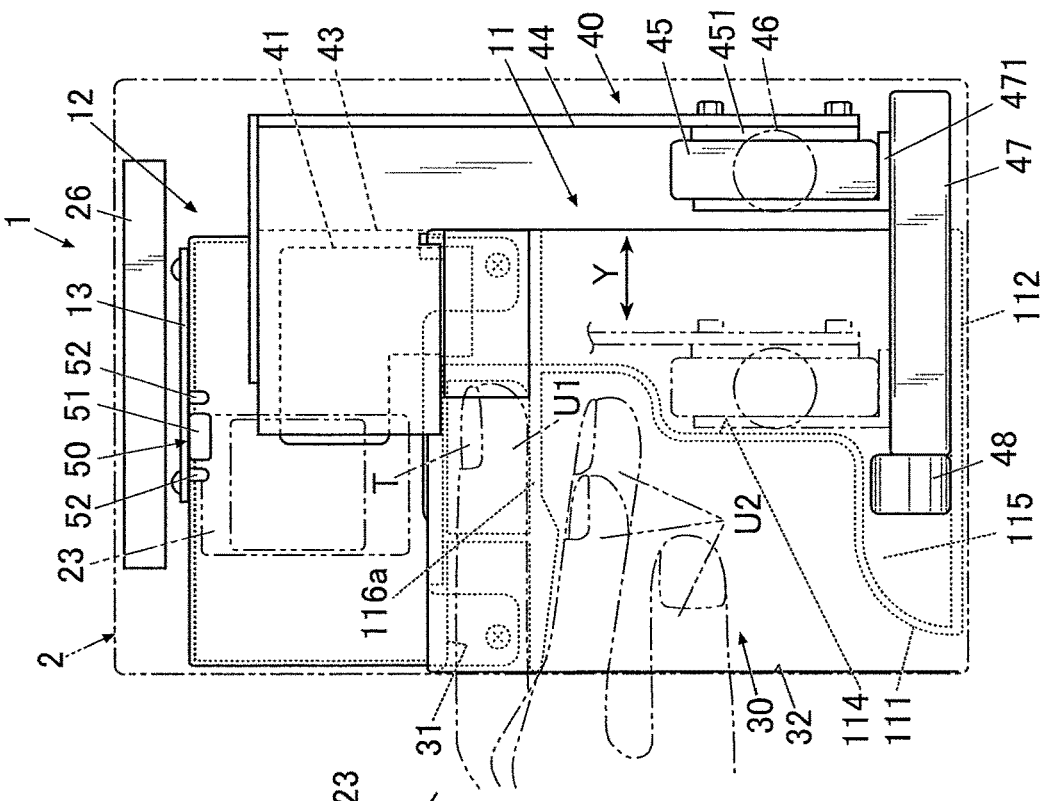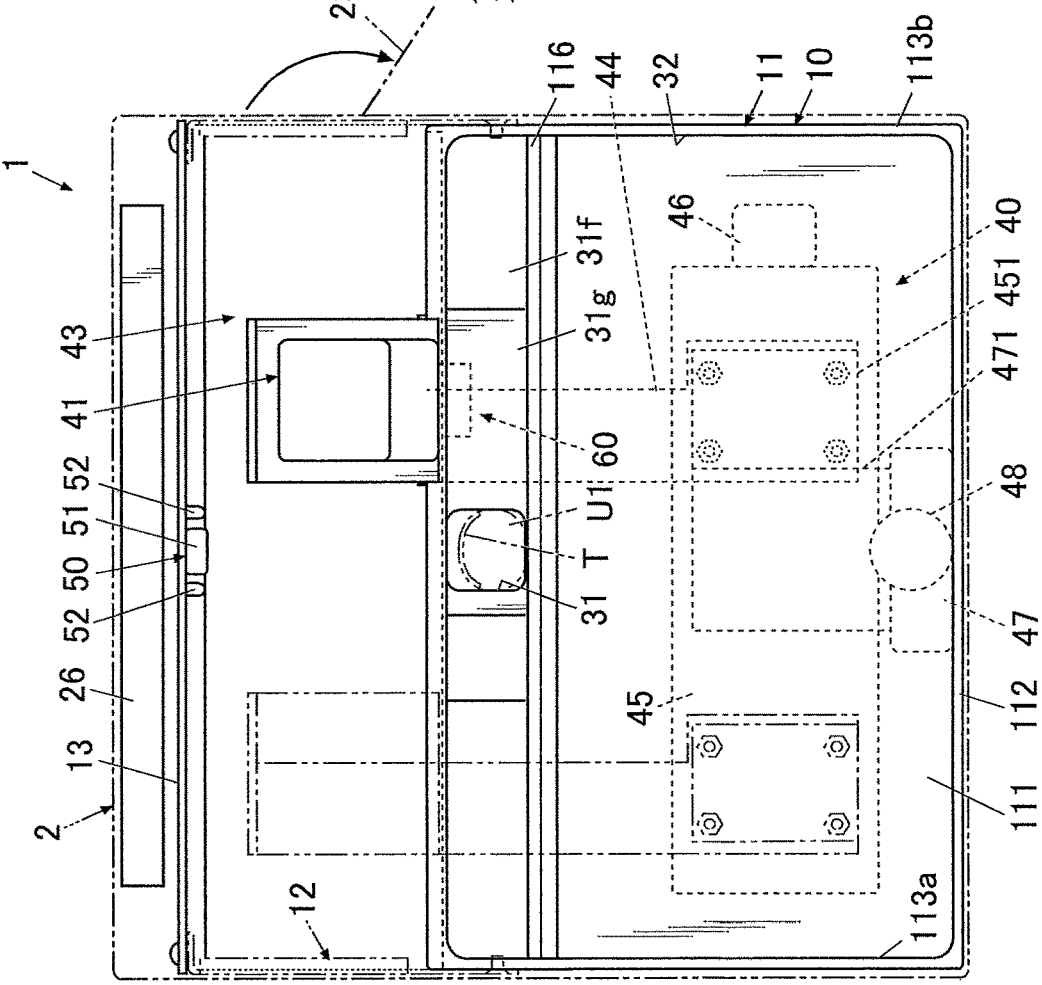

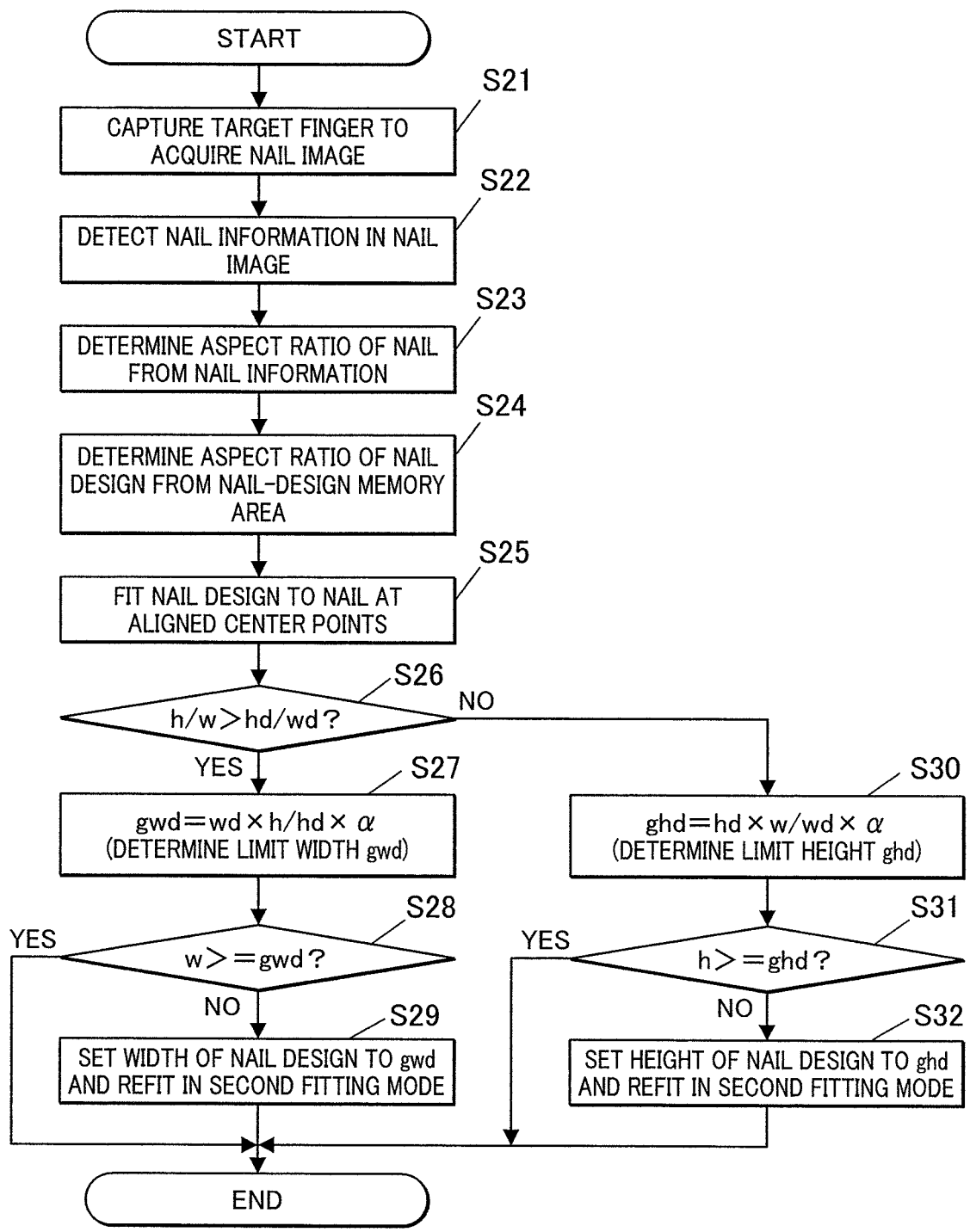

DRAWING APPARATUS, METHOD OF DRAWING, AND RECORDING MEDIUM

BACKGROUND OF THE INVENTION

1. Field of the Invention

The present invention relates to an apparatus and a method of drawing, and a recording medium.

2. Description of the Related Art

A nail drawing apparatus or nail printer is known that draws any designs chosen by a user on fingernails of the user (for example, Japanese Translation of PCT International Application Laid-Open No. 2003-534083).

Users can readily enjoy nail print with such an apparatus without visiting nail salons.

To print a nail design on a nail, the shape of the nail should be recognized, and the nail design should be fit to the shape of the nail. Such a process includes defining a circumscribed rectangle of the outline of a target nail and compressing a nail design to fit the circumscribed rectangle. If the original aspect ratio of the nail design is substantially the same as that of the target nail, the nail design can be fit to the target nail as imagined by the user.

Target nails have various shapes. In the case where the longitudinal length of the nail is larger than the transverse length as compared to the original aspect ratio of the nail design, the overall nail design fitted to the nail will be stretched and distorted across the longitudinal length. This results in an unnatural finish of the nail design.

In contrast, in the case where the transverse length of the nail is larger than the longitudinal length as compared to the original aspect ratio of the nail design, the overall nail design is compressed in the transverse direction. This causes the nail design to have a feeling different from that of the original design.

Another process of fitting a nail design to a target nail includes fitting of a nail design to a target nail without modifying the original aspect ratio of the nail design. Unfortunately, in the case of a nail having a significantly small longitudinal or transverse length, the nail design will not fit across the smaller one of the longitudinal or transverse length. This causes the overall nail design to extend beyond the outline of the nail.

BRIEF SUMMARY OF THE INVENTION

An object of the present invention, which has been conceived in light of the drawbacks described above, is to provide a drawing apparatus and a method of drawing that can fit a nail design on a target nail as imagined by the user.

According to an embodiment of the present invention, a drawing apparatus includes: a processor determining the aspect ratio of the surface area of a target nail of a finger or a toe, and entering a first fitting mode to modify the aspect ratio of at least one nail design in accordance with the surface area of the target nail and to fit the at least one nail design to the surface area of the nail, the rate of modification of the aspect ratio of the at least one nail design being within a modification threshold of the at least one nail design.

According to an embodiment of the present invention, a method of drawing includes: determining a nail-surface-area by determining an aspect ratio of the surface area of a target nail of a finger or a toe; and fitting a design in a first fitting mode by modifying the aspect ratio of a nail design in accordance with the aspect ratio of the surface area of the target nail and by fitting the nail design to the surface area of target the nail, a rate of modification of the aspect ratio of the nail design being within a preset modification threshold of the nail design.

According to an embodiment of the present invention, a non-transitory readable recording medium storing a program for causes a processor of a drawing apparatus to execute the processes of: determining the aspect ratio of the surface area of a target nail of a hand or a foot; and entering a first fitting mode to modify the aspect ratio of a nail design in accordance With the aspect ratio of the surface area of the target nail and fit the nail design to the surface area of the nail, the rate of modification of the aspect ratio of the nail design being within a modification threshold of the nail design.

BRIEF DESCRIPTION OF THE DRAWINGS

FIG. 1A is a front view of a drawing apparatus according to an embodiment. FIG. 1B is a side view of the internal configuration of the drawing apparatus illustrated in FIG. 1A.

FIG. 7 is a flow chart illustrating a fitting process according to an embodiment.

DETAILED DESCRIPTION OF THE INVENTION

Figure 2:
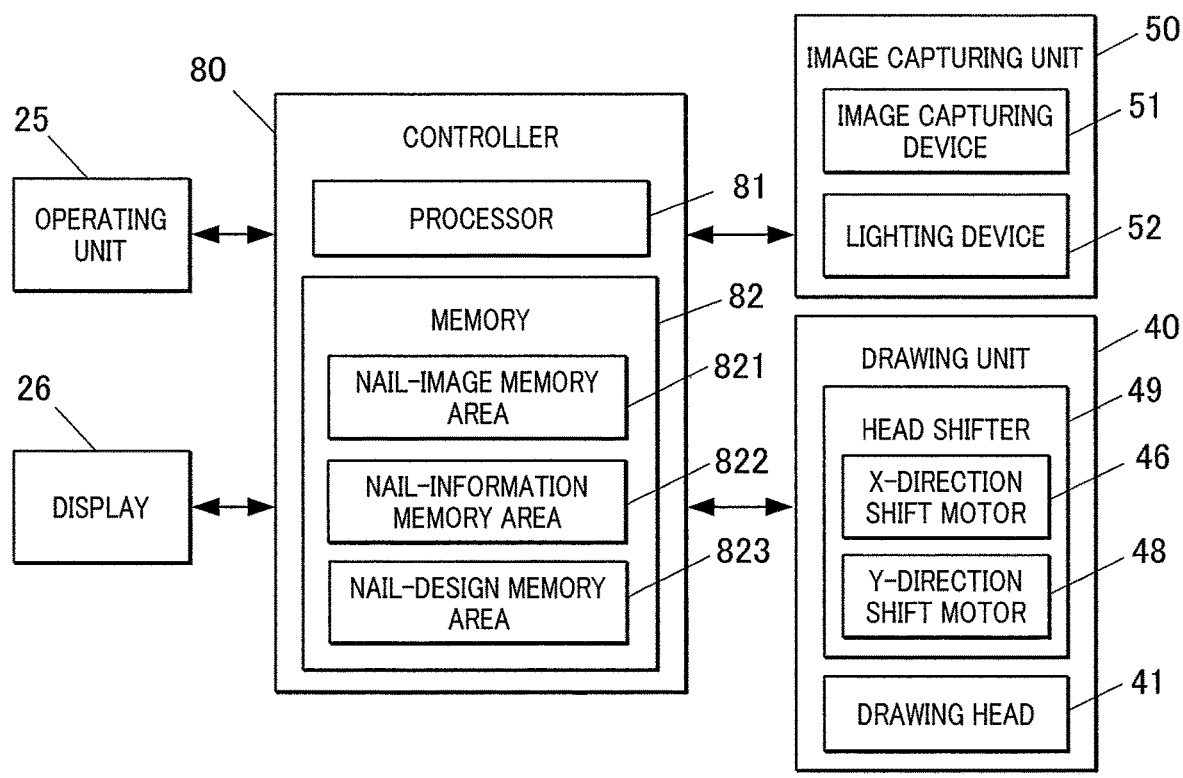
FIG. 2 is a block diagram of essential components of the control configuration of the drawing apparatus according to an embodiment.

A nail printer 1 or nail drawing apparatus and a method of drawing a pattern with the nail printer or nail drawing apparatus according to embodiments of the present invention will now be described with reference to FIG. 1 and FIGS. 8A to 8C.

The following embodiments involve various technically preferred limitations for accomplishing the present invention. The scope of the invention, however, should not be limited to the embodiments and drawings.

The target of the nail printer 1 according to the embodiments described below is the surface of a nail of a finger. The target of the present invention may be any other surface, for example, the surface of a nail of a toe.

FIG. 1A is a front view of the internal configuration of a nail printer 1. FIG. 1B is a side view of the internal configuration of the nail printer 1 illustrated in FIG. 1A, With reference to FIGS. 1A and 1B, the nail printer 1 according to this embodiment includes a drawing unit 40 including a drawing head 41 as a drawing tool. The nail printer 1 is an inkjet printer that draws a pattern on a nail T of a target finger U1. The nail printer 1 includes a case 2 and a body 10 disposed in the case 2.

A cover 23 that can be opened for replacement of the drawing head 41 of the drawing unit 40 is disposed at the upper end of a side face of the case 2. The cover 23 turns from a closed position to an open position, as illustrated in FIG. 1, for example, around a hinge.

An operating unit 25 (see FIG. 2) is disposed on the upper face or top panel of the case 2.

The operating unit 25 is an input unit operated by the user to enter various input operations.

The operating unit 25 includes, for example, a power button for turning on the power of the nail printer 1, a stop button for stopping the operation of the nail printer 1, a design selection button for selecting a design to be drawn on the nail T, a drawing button for instructing the start of drawing, and an operating button (not shown) for entering various input operations.

A display 26 is disposed in the central area of the upper face or top panel of the case 2. The display 26 is a flat display, for example, a liquid crystal display (LCD) or an organic electroluminescent display.

In this embodiment, the display 26 appropriately displays, for example, a nail image (an image of the target finger U1 including the nail T) acquired by capturing an image of the target finger U1, an image of the outline of the nail T included in the nail image, a design selection menu for selecting the design of the image to be drawn on the nail T, a thumbnail image for confirming the design, and an instruction menu for displaying various instructions.

The surface of the display 26 may be integrated with a touch panel for receiving various input operations.

The body 10 has a shape of a substantial box. The body 10 includes a lower casing 11 disposed inside the case 2 in the lower area and an upper casing 12 disposed inside the case 2 in the upper area above the lower casing 11.

The lower casing 11 will now be described.

The lower casing 11 includes a back panel 111, a bottom panel 112, right and left side panels 113a and 113b, an X-shifting-stage case 114, a Y-shifting-stage case 115, and a partition 116.

The bottom edges of the side panels 113a and 113b are connected to the left and right edges of the bottom panel 112, respectively, such that the side panels 113a and 113b are in a standing position with respect to the bottom panel 112.

The lower portion of the back panel 111 sinks in two steps toward the front in the direction fingers are to be inserted. The lower portion of the back panel 111 is connected to the front edge of the bottom panel 112. The back panel 111 partitions the space defined by the bottom panel 112 and the side panels 113a and 113b into front and rear compartments.

The space defined behind the depressed back panel 111 serves as the X-shifting-stage case 114 and the Y-shifting-stage case 115 (see FIG. 1B). The X-shifting-stage case 114 accommodates an X-shifting stage 45 of the drawing unit 40 while the drawing unit 40 shifts forward in the direction fingers are to be inserted. The Y-shifting-stage case 115 accommodates a Y-shifting stage 47 of the drawing unit 40.

The partition 116 is disposed inside the lower casing 11 to partition the space in the inner front side of the lowercasing 11 (the space defined by the back panel 111, the bottom panel 112, and the side panels 113a and 113b at the front in the direction fingers are to be inserted) into upper and lower compartments. The partition 116 is substantially horizontally disposed. The left and right edges of the partition 116 are connected to the side panels 113a and 113b, respectively. The rear end portion of the partition 116 is connected to the back panel 111.

The lower casing 11 is integrated with a finger holder 30 (see FIG. 1B). The finger holder 30 includes a finger receiver 31 that receives the finger corresponding to the target nail T on which an image is drawn (this finger is hereinafter referred to as "target finger U1") and a finger space 32 where the fingers other than the target finger U1 (which are hereinafter referred to as "non-target fingers U2") are placed.

The finger receiver 31 is disposed above the partition 116 and in the substantial middle of the lower casing 11 in the width direction. The lower compartment of the lower casing 11 partitioned by the partition 116 defines the finger space 32.

For example, to draw an image on the nail T of the ring finger, the ring finger or target finger U1 is inserted into the finger receiver 31 and the other four digits or non-target fingers U2 (thumb, index finger, middle finger, and little finger) are inserted into the finger space 32.

With reference to FIGS. 1A and 1B, the finger receiver 31 is an opening in the front face (in the direction fingers are to be inserted) of the lower casing 11. The bottom of the finger receiver 31 is partitioned by a finger rest 116a, which is a portion of the partition 116. The target finger U1 having the target nail T is placed on the finger rest 116a in the XY plane.

The finger receiver 31 has a window (not shown) at the top to expose the nail T of the target finger U1 inserted into the finger receiver 31.

Front walls 31f (see FIG. 1A) blocking the front face of the lower casing 11 are vertically disposed on the upper face of the partition 116 at the two ends of the front face of the lower casing 11. A pair of guiding walls 31g (see FIG. 1A) is vertically disposed on the upper face of the partition 116. The guiding walls 31g define a space that is tapered from the central areas of the front walls 31f toward the finger receiver 31 to guide the target finger U1 into the finger receiver 31.

The user can pinch the partition 116 with the target finger U1 in the finger receiver 31 and the non-target fingers U2 in the finger space 32. This stabilizes the target finger U1 disposed in the finger receiver 31.

A home area 60 for holding the drawing head 41 during a standby mode is provided adjacent to the finger receiver 31 (on the right in FIG. 1A) on the upper face of the lower casing 11 within the movable region of the drawing head 41 described below.

An inkjet maintenance unit is disposed in the home area 60 facing the drawing head 41 disposed in the home area 60 during the standby mode. The inkjet maintenance unit includes, for example, a cleaning mechanism (not shown) for cleaning the ink ejector (nozzle face) of the drawing head 41 and a cap mechanism (not shown) for maintaining a moist state of the ink ejector (nozzle face).

The inkjet maintenance unit may be disposed at any other position in the home area.

The drawing unit 40 includes a drawing head 41, a support 44 that supports the drawing head 41, an X-shifting stage 45 that shifts the drawing head 41 in the X or right-left direction of the nail printer 1 in FIG. 1A, an X-direction shift motor 46, a Y-shifting stage 47 that shifts the drawing head 41 in the Y or front-back direction of the nail printer 1 in FIG. 1B, and a Y-direction shift motor 48.

The drawing head 41 is supported by a head holder 43 and disposed on the support 44 according to this embodiment.

The drawing head 41 is of an integrated cartridge type that includes ink cartridges (not shown), for example, for yellow (y), magenta (M), and cyan (C) inks integrated with ink ejectors (not shown) disposed on a plane facing the nail T (the lower face in this embodiment illustrated in FIG. 1A) on which a pattern is to be drawn. The ink ejector includes nozzle arrays each including multiple nozzles that eject different color inks. The drawing head 41 ejects microdroplets of ink from the ink ejector directly onto the drawing surface of the target nail T to draw a pattern.

The drawing head 41 may eject ink of any color besides the three colors mentioned above. Other ink cartridges and ink ejectors for other colors of ink may also be provided.

The support 44 is fixed to a X-direction shifter 451 fixed to the X-shifting stage 45. The X-direction shifter 451 shifts in the X direction along a guide (not shown) on the X-shifting stage 45 by the driving force of the X-direction shift motor 46. This shifts the drawing head 41 fixed to the support 44 in the X or right-left direction of the nail printer 1 in FIG. 1A.

The X-shifting stage 45 is fixed to a Y-direction shifter 471 of the Y-shifting stage 47. The Y-direction shifter 471 shifts in the Y direction along a guide (not shown) on the Y-shifting stage 47 by the driving force of the Y-direction shift motor 48. This shifts the drawing head 41 fixed to the support 44 in the Y or front-back direction of the nail printer 1 in FIG. 1B.

In this embodiment, the X-shifting stage 45 is an assembly of the X-direction shift motor 46, ball screws, and a guide (not shown), and the Y-shifting stage 47 is an assembly of the Y-direction shift motor 48, ball screws, and a guide (not shown).

In this embodiment, the X-direction shift motor 46 and the Y-direction shift motor 48 constitute an XY driver or head shifter 49 that drives the drawing head 41 in the X and Y directions.

The drawing head 41, the X-direction shift motor 46, and the Y-direction shift motor 48 of the drawing unit 40 are connected to the processor 81 of a controller 80 described below (see FIG. 2) and are controlled under a drawing control process executed by the processor 81.

An image capturing unit 50 includes an image capturing device 51 and lighting devices 52.

The lighting devices 52 of the image capturing unit 50 illuminate the nail T and the target finger U1 inserted in the finger receiver 31 and exposed through the window. The image capturing device 51 captures an image of the target finger U1 and acquires a nail image or an image of the target finger U1 including the nail T.

The image capturing device 51 and the lighting devices 52 according to this embodiment are disposed on the upper casing 12, as illustrated in FIGS. 1A and 1B.

In detail, the image capturing device 51 and the lighting devices 52 of the image capturing unit 50 are disposed on the bottom face of a substrate 13 disposed on the upper casing 12 so as to face the partition 116.

The image capturing device 51 and the lighting devices 52 may be disposed at any position other than those illustrated in the drawings on the substrate 13.

The image capturing device 51 is, for example, a compact image capturing device including a solid-state image sensor provided with approximately 2 million or more pixels and a lens.

In this embodiment, the image capturing device 51 of the image capturing unit 50 captures a nail image or an image of the target finger U1 including the nail T.

The nail-information selecting process described below detects the positions and shapes or outlines of the target finger U1 and the target nail T, and the aspect ratio of the nail T in the nail image.

The lighting devices 52 are, for example, white LEDs.

In this embodiment, four lighting devices 52 are disposed on the right, left, front, and back of the image capturing device 51 so as to surround the image capturing device 51. The lighting devices 52 emits light downward to illuminate the image-capturing area beneath the image capturing device 51.

Any number of lighting devices 52 may be disposed at any positions besides those illustrated in the drawings.

The image capturing unit 50 is connected to the processor 81 (see FIG. 2) of the controller 80 described below and controlled by the processor 81.

Image data of nail images captured by the image capturing unit 50 is stored in a nail-image memory area 821 of a memory 82 described below.

The controller 80 is, for example, disposed on the substrate 13 on the upper casing 12.

FIG. 2 is a block diagram of essential components of the control configuration according to this embodiment.

With reference to FIG. 2, the controller 80 is a computer including a processor 81 and a memory 82 including a read only memory (ROM) and a random access memory (RAM) (both not shown).

The memory 82 stores various programs and data items for operating the nail printer 1.

In detail, the ROM of the memory 82 stores programs, such as a nail-information detecting program for detecting the position and shape or outline of the target finger U1, the position and shape or outline of the nail T, and the aspect ratio and other parameters of the nail T, a design fitting program for fitting a nail design D to the nail T, a drawing-data generating program for generating drawing data, and a drawing program for executing a drawing process. These programs are executed by the controller 80 to comprehensively control the components of the nail printer 1.

The memory 82 according to this embodiment includes a nail-image memory area 821 storing nail images of the nail T of the target finger U1 of a user captured by the image capturing unit 50, a nail-information memory area 822 storing nail information (which includes the outlines of the target finger U1 and the nail T and the aspect ratio of the nail T) detected through the nail-information detecting process, and a nail-design memory area 823 storing image data (also referred to as "design data") on nail designs D to be printed on the target nail T.

Figure 3:
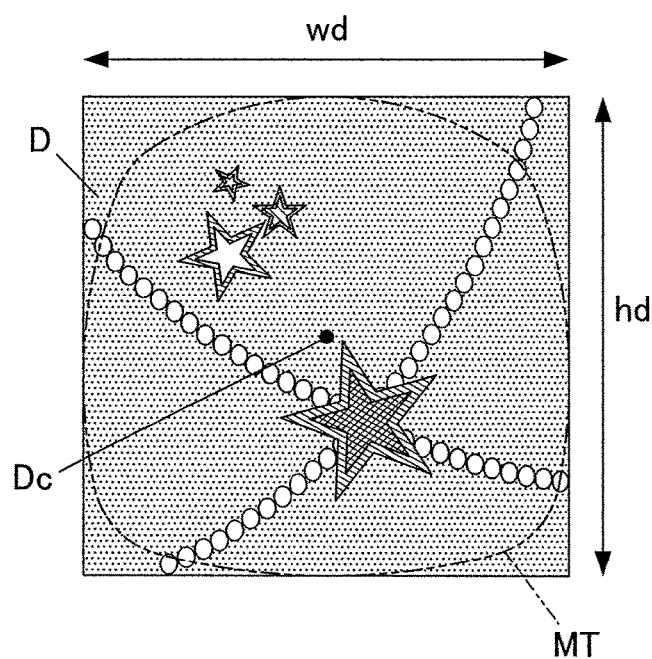
FIG. 3 is a plan view of an example nail design.

The design data stored in the nail-design memory area 823 is image data on nail designs D that have an aspect ratio hd/wd that is equal to the aspect ratio of a circumscribed rectangle of a model nail MT having a typical or average shape or aspect ratio (the rectangle indicated in solid lines in FIG. 3), where the wd represents the length of the circumscribed rectangle in the transverse or width direction of the nail and hd represents the length in the longitudinal direction or the extending direction of a model nail MT orthogonal to the width direction of the nail (see FIG. 3). The design data includes the information on the longitudinal length hd, the transverse length wd, and the aspect ratio hd/wd of the nail design D.

If all design data items are prepared for the same model nail MT, the longitudinal length hd, the transverse length wd, and the aspect ratio hd/wd of the nail design D each have a default value on the whole. In this case, the individual design data items do not require the information on these default values.

In this embodiment, the design data has a preset modification threshold (compression threshold $\alpha$ in FIGS. 5 and 7) corresponding to the limits of modification allowed to the nail design D in the longitudinal and transverse directions. The design data items each include the modification threshold.

The modification threshold indicates the limit to which the entire feeling or the balance of the overall design is unaffected in the case where the nail design D is compressed or expanded in the longitudinal or transverse direction. The preliminarily selected modification threshold indicates the limit to which modification in shape is not readily recognizable. In the case where the shape of a nail design D is modified (i.e., compressed or expanded in a single direction), the modification may be controlled without exceeding the modification threshold, to achieve appropriate printing of a pattern having a design exactly as imagined by the user, on the nail T.

The modification threshold differs between individual nail designs D. A nail design D having an overall feeling that cannot be readily changed through compression or expansion in one of the longitudinal and transverse directions has a relatively high modification threshold. In contrast, a nail design D that undergoes a significant change in feeling and a loss of balance as a result of a small degree of compression or expansion in one of the longitudinal and transverse directions of the nail design D has a low modification threshold or even a modification threshold of zero depending on the design.

For example, compression or expansion in one of the longitudinal and transverse directions of a French nail design in which a line is drawn at the tip of the nail or a gradation of several colors does not readily change the feeling of the overall design. Thus, the modification threshold of such a nail design D is a relatively high value of, for example, 30%, which permits a design to be compressed to 70% of its original size.

Compression or expansion of a design including for example, a face of a character in one of the longitudinal and transverse directions readily changes the feeling and the overall balance of the design. Thus, the modification threshold of such a nail design D is a relatively low value of, for example, 5%, which permits the design to be compressed to 95% of its original size without a change in the feeling.

The modification threshold may be a default value or may be selected or modified by the user. The modification threshold may be selected for each nail design D. Alternatively, the nail designs D may be categorized into several groups depending on, for example, the susceptibility of the feeling to compression or expansion, and a modification threshold may be determined for each category.

A single nail design D may have two modification thresholds, one for the longitudinal direction and another for the transverse direction, and, alternatively, may have the same modification threshold for the longitudinal and transverse directions.

In the case where the longitudinal and transverse directions have different modification thresholds, when the feeling of a design is susceptible to compression or expansion in the transverse direction but insusceptible to compression or expansion in the longitudinal direction, the modification threshold for the longitudinal direction is set relatively higher and the modification threshold for the transverse direction is set relatively lower.

The processor 81 functions as an imaging controller, a nail-information detector, a design fitter, a drawing-data generator, a drawing controller, and a display controller. These functions are achieved by the CPU of the processor 81 in cooperation of the programs stored in the ROM of the memory 82.

The processor 81 executes the imaging control process to control the image capturing device 51 and the lighting devices 52 of the image capturing unit 50 and capture an image of the target finger U1 placed in the finger receiver 31 (hereinafter, an image of the target finger U1 including the nail T is referred to as "nail image") with the image capturing device 51.

Image data on the nail image captured by the image capturing unit 50 is stored in the nail-image memory area 821 of the memory 82.

The nail-information detecting process executed by the processor 81 detects the outline of the target finger U1, the outline or shape of the target nail T, and the aspect ratio of the nail T, in a nail image including the target finger U1 including the nail T captured by the image capturing device 51 of the image capturing unit 50.

Figure 4:
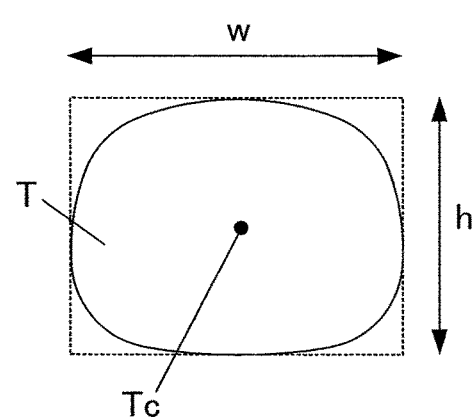
FIG. 4 is a plan view of an example target nail.

The aspect ratio of the nail T is represented by h/w, where w represents the transverse length of a circumscribed rectangle of the outline of the nail T (the rectangle indicated by the dot line in FIG. 4) and h represents the longitudinal length of the circumscribed rectangle in the extending direction of the nail T orthogonal to the width direction (see FIG. 4).

Nail information including the shapes or outlines of the target finger U1 and the nail T is detected through the nail-information detecting process on the basis of, for example, the color difference between the target finger U1 and nail T and the background (the finger rest 116a in this embodiment). The boundary between the nail T and the skin of the target finger U1 is detected on the basis of the color difference between the nail T and the target finger U1 and/or the shades to determine the shape or outline of the nail T. Alternatively, the nail information may be detected through any other detection scheme.

Detection of nail information by the processor 81 including the outlines of the target finger U1 and the nail T and the aspect ratio of the nail T in a nail image captured by the image capturing unit 50 will now be explained. The nail information detected in a nail image may be any other information, for example, the curvature of the nail T.

Design fitting is a process of transforming the design data on a nail design D to be printed on a nail T so as to fit the nail design D to the nail T.

In this embodiment, the processor 81 has first and second fitting modes as fitting process. In the first fitting mode, the design data is compressed or expanded in the longitudinal or transverse direction so as to modify the aspect ratio of the nail design D in accordance with the aspect ratio of the nail T. In the second fitting mode, the design data is compressed or expanded without modification of the aspect ratio of the nail design D.

The processor 81 switches between the first and second fitting modes to transform the design data on the nail design D to be printed to the nail T so as to fit the nail design D to the nail T.

In this embodiment, a modification threshold is selected for each nail design D as described above. The processor 81 compresses or expands the nail design D within the modification threshold.

In this embodiment, the longitudinal length hd and the transverse length wd of the design data are presumed to be larger than the longitudinal length h and the transverse length w, respectively, of a typical nail T. Thus, the processor 81 transforms the design data so as to fit the nail design D to the nail T by compression of the design data. In such a case, the modification threshold is a compression threshed indicating the limit to which the feeling of the nail design D is not significantly affected by the compression of the design data. In the case where the longitudinal length hd and the transverse length wd of the design data are smaller than the longitudinal length h and the transverse length w, respectively, of a typical nail T, the processor 81 expands the design data so as to fit the nail design D to the nail T. In such a case, the modification threshold is an expansion threshold indicating the limit to which the feeling of the nail design D is not significantly affected by the expansion of the design data.

The processor 81 executes the fitting process in accordance with one of the following schemes: 1) entering the second fitting mode for fitting and then switching to the first fitting mode for modification; 2) entering the first fitting mode for fitting and then switching to the second fitting mode for modification.

The first or second scheme may be preset by a default value or selected by the user. Alternatively, the processor 81 may determine the preferential selection of the scheme on the basis of the results detected in the nail-information detecting process executed by the processor 81.

Details on these schemes will be described below.

In the drawing-data generating process executed by the processor 81, data for the pattern to be drawn on the nail T of the target finger U1 by the drawing head 41 is generated on the basis of the result of the fitting process executed by the processor 81.

In the drawing-data generating process executed by the processor 81 in this embodiment, the curved surface correction is appropriately executed on design data expanded or compressed to fit the nail T, to generate image data on the nail design D to be printed by the drawing head 41.

The processor 81 under the drawing controlling process outputs control signals to the drawing unit 40 based on the drawing data generated in the drawing-data generating process and controls the X-direction shift motor 46, the Y-direction shift motor 48, and the drawing head 41 of the drawing unit 40 so as to print a pattern in accordance with the drawing data on the nail T.

The processor 81 under the displaying control process controls the display 26 so as to cause various menus to appear on the display 26. The display controlling process executed by the processor 81 according to this embodiment causes, for example, a menu for selecting the nail design D, thumbnail images for confirming the design, an image of the nail T after fitting of the nail design D, a nail image of the target finger U1, various instruction menus, and other menus to appear on the display 26.

The method of drawing by the nail printer 1 according to this embodiment will now be described with reference to FIGS. 3 to 8.

FIG. 3 illustrates an example nail design D. FIG. 4 illustrates an example target nail T of a user.

With reference to FIG. 3, the nail design D has an aspect ratio hd/wd that is the same as that of the circumscribed rectangle (indicated by the solid line in FIG. 3) of the outline of the model nail MT. A center point Dc is disposed at the center of the nail design D in FIG. 3. The nail T illustrated in FIG. 4 has a larger transverse length than that of the model nail MT illustrated in FIG. 3. In FIG. 4, the longitudinal length and transverse length of the nail T are defined by the longitudinal length h and the transverse length w, respectively, of the circumscribed rectangle (indicated by the dot line in FIG. 4) of the outline of the nail T. A center point Tc is disposed at the center of the nail T in FIG. 4

Figure 5:
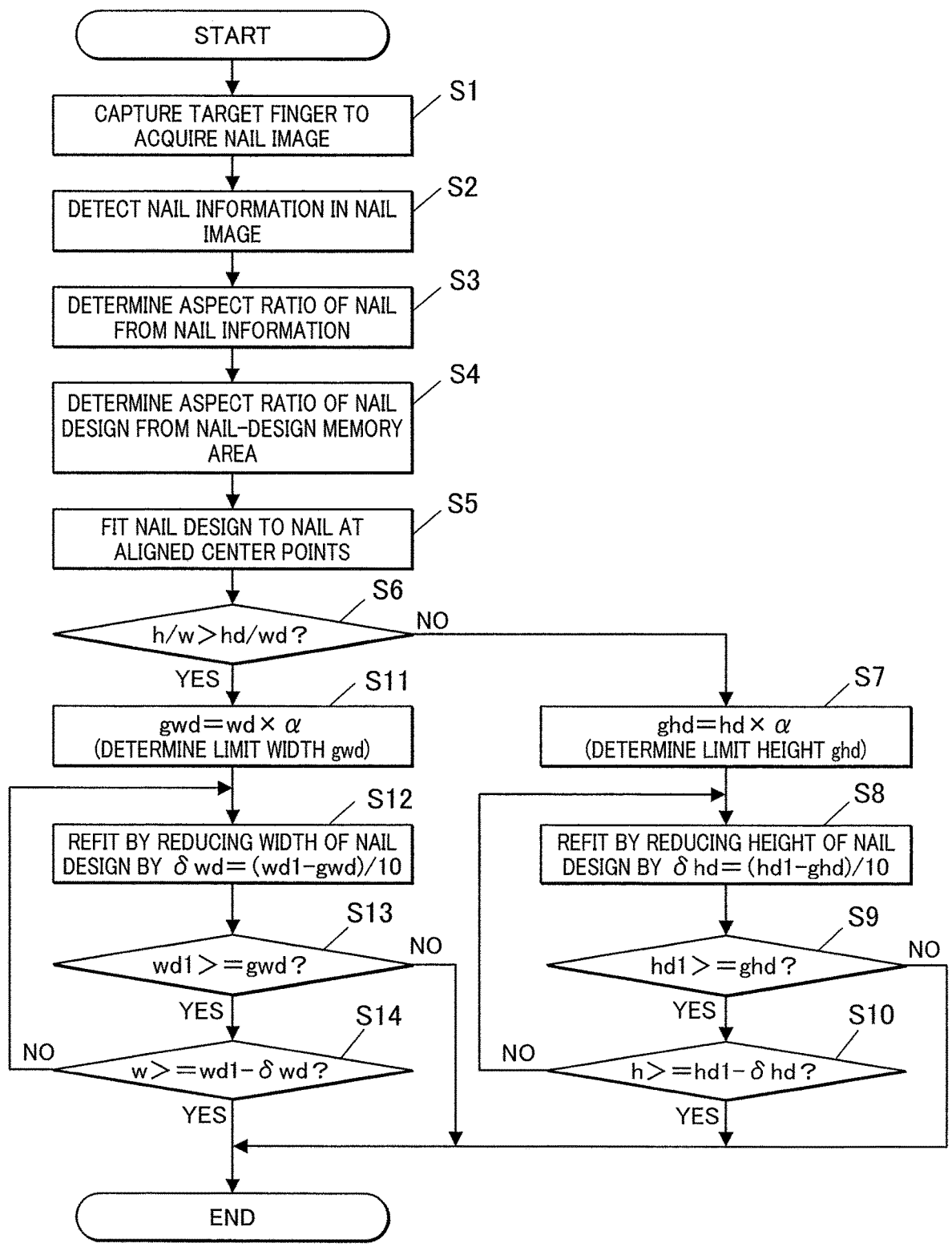
FIG. 5 is a flow chart illustrating a fitting process according to an embodiment.
Figure 6A:
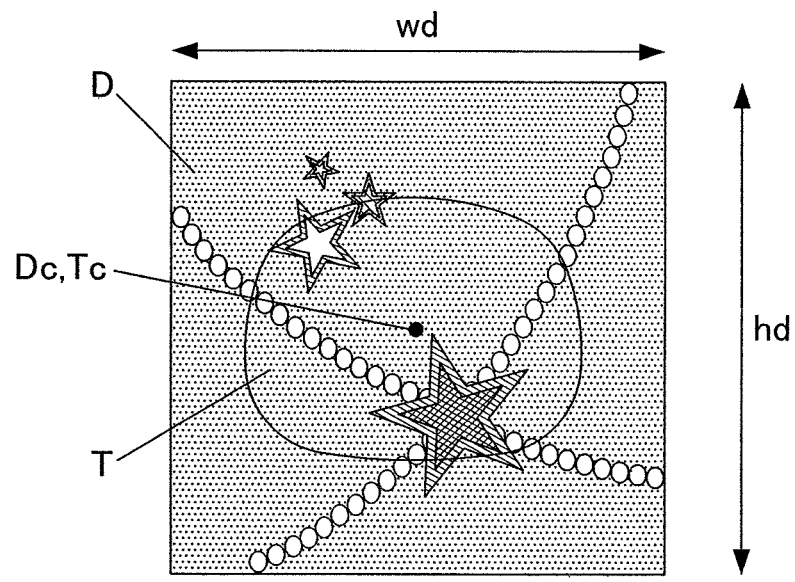
FIGS. 6A to 6C are schematic diagrams illustrating the fitting process in FIG. 5.
Figure 6B:
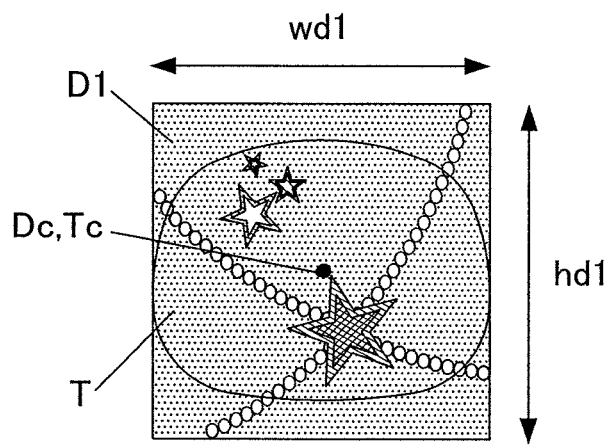
Figure 6C:
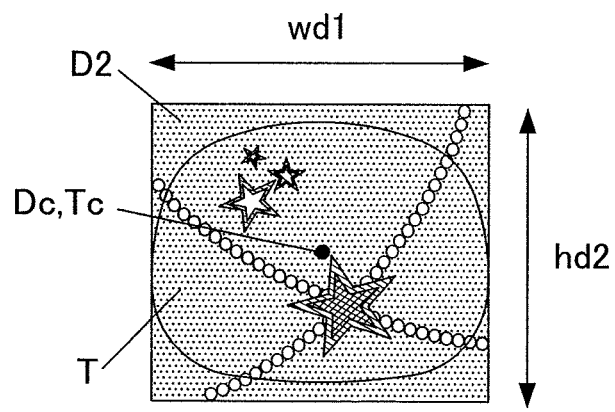

FIG. 5 is a flow chart illustrating the process of fitting the nail design D illustrated in FIG. 3 to the nail T illustrated in FIG. 4. The process involves fitting in the second fitting mode and then modification by the first fitting mode. FIGS. 6A to 6C schematically illustrate this fitting process.

During the fitting process carried out in the second fitting mode, the processor 81 controls the image capturing unit 50 to capture an image of the target finger U1 with the image capturing device 51 while the lighting devices 52 illuminates the target finger U1. In this way, the processor 81 captures a nail image of the nail T, as illustrated in FIG. 4 (step S1). After the nail image is captured, the processor 81 executes the nail-information detecting process to determine the shape or outline of the nail T (step S2). The processor 81 then determines the longitudinal length h, the transverse length w, and the aspect ratio h/w of the nail T from the nail information (step S3). The processor 81 then acquires the aspect ratio hd/wd of the nail design D from the nail-design memory area 823 (step S4).

In the second fitting mode, the design data on the nail design D is expanded or compressed without modification of the aspect ratio of the nail design D until at least one of the longitudinal length hd and the transverse length wd of the nail design D matches the corresponding longitudinal length h or transverse length w of the nail T. In detail, the nail design D is fit to the nail T while the center point Dc of the nail design D is aligned with the center point Tc of the nail T, as illustrated in FIG. 6A (step S5).

In this embodiment, the nail T in FIG. 4 has a transverse length w larger than the longitudinal length h. Thus, transformation (compression in this embodiment) of the design data without modification of the aspect ratio of the nail design D causes the two sides of the nail design D to match the two sides of the nail T.

The nail design D is compressed to a nail design D1, as illustrated in FIG. 6B. The transverse length wd1 of the nail design D1 equals the transverse length w of the nail T, and the longitudinal length hd1 of the nail design D1 is larger than the longitudinal length h of the nail T. Thus, the top and the bottom of the nail design D1 expand outside the top and the bottom of the nail T.

The design data is modified (compressed in this embodiment) until at least one of the longitudinal length hd and the transverse length wd of the nail design D match the corresponding longitudinal length h and/or transverse length w of the nail T. The fitting process in the second fitting mode then ends.

After the fitting process in the second fitting mode ends, the processor 81 enters the first fitting mode to compress or expand the design data without exceeding the modification threshold of the nail design D so as to match the longitudinal length hd or transverse length wd of the nail design D to the corresponding longitudinal length h or transverse length w of the nail T, for the longitudinal length hd or transverse length wd not matching the corresponding longitudinal length h or transverse length w of the nail T.

In detail, the processor 81 determines whether the aspect ratio h/w of the nail T is larger than the aspect ratio hd/wd of the nail design D (step S6).

In this embodiment, the aspect ratio h/w of the nail T is smaller than the aspect ratio hd/wd of the nail design D ("NO" in step S6).

In such a case, the processor 81 determines a limit height ghd corresponding to the modification threshold (which is the compression threshold in this case and is represented by α in FIG. 5) (step S7). In specific, the expression "ghd=hd×α" in step S7 in FIG. 5 holds if the compression threshold is a value in the range of 0 to 1. The processor 81 multiplies the longitudinal length hd of the nail design D corresponding to the uncompressed design data by the compression threshold α, which indicates the limit of compression, to determine the limit length of the nail design D in the longitudinal direction.

The processor 81 gradually compresses the design data until the nail design D fits the nail T within the limit height ghd.

In specific, the longitudinal length hd1 of the nail design D1 to be fitted (see FIG. 6B) is gradually compressed so that the longitudinal length hd1 is not reduced below the limit height ghd. In this embodiment, re-fitting is carried out by compressing the longitudinal length hd1 in an increment of δhd, wherein δhd equals ¹⁄₁₀ of the difference between hd1 and ghd, i.e., δhd=(hd1−ghd)/10 (step S8).

The design data may be compressed for re-fitting within the limit height ghd through any other scheme. For example, the compression for the re-fitting may be repeated in an increment smaller than ¹⁄₁₀ of the difference between hd1 and ghd. Alternatively, coarse compression for re-fitting may be carried out predetermined times in relatively large increments, and then fine compression may be carried out in smaller increments. In such a case, the number of repeated re-fitting operations can be reduced while fine adjustment can be achieved near the limit, so as to fit the design data as closely as possible to the limit height ghd. The design data may be compressed in units other than length. For example, each pixel of the design data may be individually compressed to modify the design data.

The processor 81 constantly determines whether the longitudinal length hd2 of the compressed nail design D2 (see FIG. 6C) is larger than the limit height ghd (step S9). If the longitudinal length hd2 does not exceed the limit height ghd (if the longitudinal length hd2 smaller than the limit height ghd) ("NO" in step S9), the fitting process ends. In contrast, if the longitudinal length hd2 is larger than the limit height ghd ("YES" in step S9), the processor 81 determines whether the longitudinal length hd2 (=hd1−δhd) of the compressed nail design D2 is smaller than or equal to the longitudinal length h of the nail T (step S10).

If the longitudinal length hd2 (=hd1−δhd) of the compressed nail design D2 is smaller than or equal to the longitudinal length h of the nail T ("YES" in step S10), the fitting process ends. If the longitudinal length hd2 (=hd1−δhd) of the compressed nail design D2 is larger than the longitudinal length h of the nail T ("NO" in step S10), the process goes to step S8 and repeats the re-fitting process while gradually compressing the nail design D.

If the aspect ratio h/w of the nail T is larger than the aspect ratio hd/wd of the nail design D ("YES" in step S6), the nail T may have a longitudinal length larger than that of the model nail MT on which the nail design D is to be drawn.

In such a case, the processor 81 determines a limit width gwd corresponding to the modification threshold α (step S11). Similar to the case of an aspect ratio h/w of the nail T smaller than the aspect ratio hd/wd of the nail design D ("NO" in step S6), the expression "gwd=wd×α" in step S11 in FIG. 5 holds if the compression threshold is a value within the range of 0 to 1. In detail, the transverse length wd of the nail design D corresponding to the uncompressed design data is multiplied by the compression threshold α, which indicates the limit of compression, to determine the limit width of the nail design D in the transverse direction.

The processor 81 gradually compresses the design data until the nail design D fits the nail T within the limit width gwd.

Steps S12 to S14 of the fitting process are the same as steps S8 to S10 of the fitting process for the longitudinal length of the nail design D. Thus, redundant descriptions are omitted.

Figure 8A:
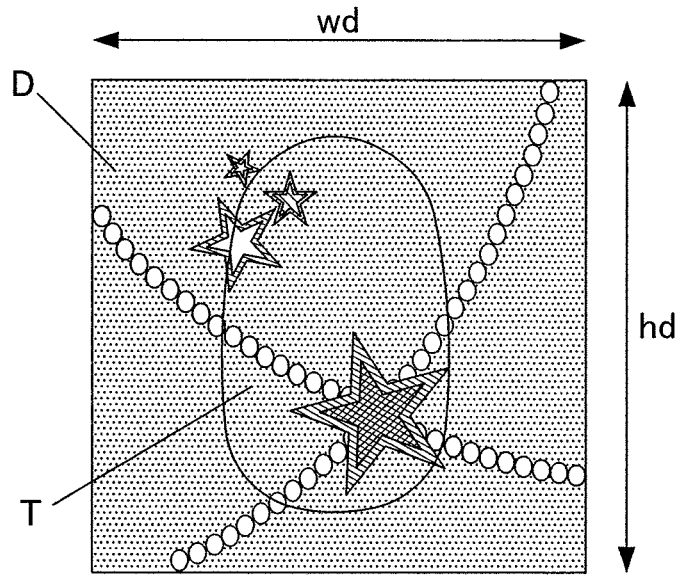
FIGS. 8A to 8C are schematic diagrams illustrating the fitting process in FIG. 7.
Figure 8B:
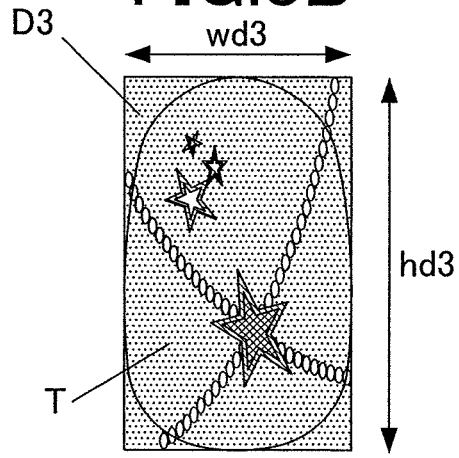
Figure 8C:
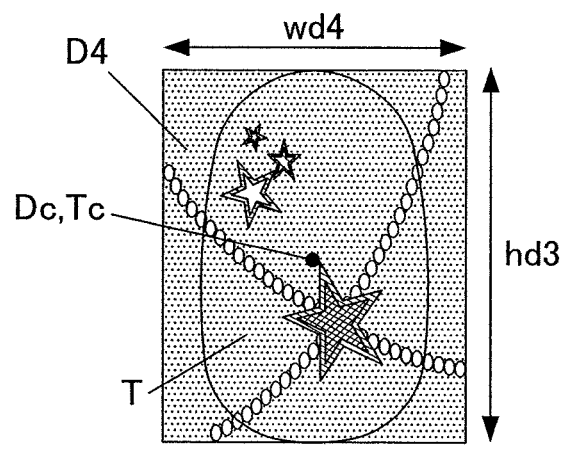

FIG. 7 is a flow chart illustrating a process of fitting the nail design D in FIG. 3 to the nail T by entering the first fitting mode for fitting and then entering the second fitting mode for modification. FIGS. 8A to 8C schematically illustrate the process.

Steps S21 to S24 in FIG. 7 are the same as step S1 to S4 in FIG. 5. Thus, redundant descriptions are omitted.

In the first fitting mode, the design data is compressed or expanded to modify the aspect ratio hd/wd of the nail design D in accordance with the aspect ratio h/w of the nail T. In detail, the nail design D is fit to the nail T by matching the aspect ratio hd/wd of the nail design D to the aspect ratio h/w of the nail T, as illustrated in FIGS. 8A and 8B (step S25).

In this embodiment, the nail T in FIGS. 8A to 8C has a longitudinal length h larger than the transverse length w. Thus, the nail design D3 obtained by compressing the nail design D to fit the nail T has a transverse length wd3 equal to the transverse length w of the nail T, and a longitudinal length hd3 equal to the longitudinal length h of the nail T, as illustrated in FIG. 8B. The size of the nail design D3 substantially equal to the size of the circumscribed rectangle of the outline of the nail T.

If the longitudinal length hd3 or the transverse length wd3 of the nail design D3 of the compressed or expanded design data exceeds the modification threshold α of the nail design D after the fitting process in the first fitting mode is completed, the processor 81 readjusts the longitudinal length hd3 or the transverse length wd3 of the nail design D3 within the modification threshold α.

In detail, the processor 81 determines whether the aspect ratio h/w of the nail T is larger than the aspect ratio hd/wd of the nail design D (step S26).

In this embodiment, the aspect ratio h/w of the nail T is larger than the aspect ratio hd/wd of the nail design D ("YES" in step S26).

The processor 81 determines the limit width gwd corresponding to the modification threshold of the nail design D (which is a compression threshold in this case and is represented by a in FIG. 7) if the longitudinal length hd of the nail design D equals the longitudinal length h of the nail T (step S27).

The processor 81 determines whether the transverse length w of the nail T is larger than or equal to the limit width gwd (step S28). If the transverse length w of the nail T is larger than or equal to the limit width gwd ("YES" in step S28), the fitting process ends because the transverse length wd3 of the current nail design D3 (see FIG. 8B) is within the modification threshold α.

If the transverse length w of the nail T is smaller than the limit width gwd ("NO" in step S28), the transverse length wd3 of the current nail design D3 (see FIG. 8B) exceeds the modification threshold α and is over-compressed. Thus, the processor 81 enters the second fitting mode to expand the transverse length wd4 of the nail design D4 to the limit width gwd and re-fits the nail design D4 to the nail T while the center point Dc of the nail design D4 is aligned with the center point Tc of the nail T, as illustrated in FIG. 8C (step S29).

If the aspect ratio h/w of the nail T is smaller than the aspect ratio hd/wd of the nail design D ("NO" step S26), the nail T may have a transverse length larger than that of the model nail MT on which the nail design D is to be drawn.

In such a case, similar to the case of an aspect ratio h/w of the nail T larger than the aspect ratio hd/wd of the nail design D ("YES" in step S26), the processor 81 determines the limit height ghd corresponding to the modification threshold α of the nail design D if the transverse length wd of the nail design D equals the transverse length w of the nail T (step S30).

If the longitudinal length hd3 or transverse length wd3 of the nail design D3 corresponding to the compressed or expanded design data exceeds the modification threshold α of the nail design D, the processor 81 readjusts the longitudinal length hd3 or the transverse length wd3 within the modification threshold α.

Steps S31 and S32 of the fitting process are the same as steps S28 and S29 in the fitting process of the transverse length of the nail design D. Thus, redundant descriptions are omitted.

Whether the processor 81 is to execute the fitting process preferentially through the scheme illustrated in FIG. 5 and FIGS. 6A to 6C or the scheme illustrated in FIG. 7 and FIGS. 8A to 8C may be indicated by a default value or selected by the user. Alternatively, the processor 81 may select either scheme on the basis of the aspect ratios of the nail T and the nail design D.

After the fitting of the nail design D to the nail T through the design fitting process executed by the processor 81 is completed, the processor 81 executes the drawing-data generating process to generate data for drawing on the basis of the results of the fitting and controls the drawing unit 40 on the basis of the data for drawing generated through the drawing-data generating process to print the nail design D on the nail T.

The results of the design fitting may appear on the display 26, so that the user can confirm these results.

In such a case, the user may approve the results of the fitting or carry out fine adjustment of the position and size of the nail design D in the longitudinal and transverse directions on the nail T by inputting instructions on the touch panel. An operating button may be provided for reverting the adjustments by the user and returning the results of the automatic design fitting. In this way, even if the adjustments by the user fail, the nail design D can be readily returned to the automatically fitted state.

The results of the fitting may be stored in the memory 82. The same user can read the results of the fitting stored in correlation with the user and the information on the nail T, select the same nail design D, and thus promptly print the nail design D that fits the nail T.

As described above in this embodiment, the aspect ratio of the nail T is determined, and the design data of the nail design D to be printed on the nail T is transformed to fit the nail design D to the nail T by switching between the first fitting mode for compression or expansion of the design data to modify the aspect ratio of the nail design D in accordance with the aspect ratio of the nail T and the second fitting mode for compression or expansion of the design data without modification of the aspect ratio of the nail design D. Thus, the nail design D can be printed on a nail T having an aspect ratio different from that of a typical nail (for example, a significantly long or wide nail) without a significant difference in feeling, in other words, very similar to the feeling imagined by the user.

A modification threshold α, which determines the limit of modification in the longitudinal and transverse directions of the nail design D, is preliminarily selected for the design data according to this embodiment.

Thus, even in the case of compression or expansion in the longitudinal and transverse directions for fitting of the nail design D to the nail T, modification of the shape of the nail design D can be limited to an extent that does not affect the entire feeling or the balance of the overall design, and the design can be appropriately printed on the nail T as imagined by the user.

The processor 81 can execute the fitting process by entering the second fitting mode to expand or compress the design data until at least one of the longitudinal and transverse lengths of the nail design match the corresponding longitudinal and/or transverse lengths of the nail and then entering the first fitting mode to compress or expand the design data within the modification threshold of the nail design until the longitudinal or transverse length of the nail design not matching the corresponding longitudinal or transverse length of the nail matches the corresponding longitudinal or transverse length of the nail.

Thus, modification of the nail design and/or change in the feeling of the nail design can be prevented, and thereby a design having a feeling similar to that of the original nail design D can be printed on the nail T.

The processor 81 can execute the fitting process by entering the first fitting mode to compress or expand the design data until the longitudinal or transverse length of the nail design matches the corresponding longitudinal or transverse length of the nail, and then readjusting the longitudinal or transverse length of the nail design corresponding to the compressed or expanded design data within the modification threshold if the longitudinal or transverse length of the nail design corresponding to the compressed or expanded design data exceeds the modification threshold.

Thus, the longitudinal and transverse lengths of the nail design D can be fit to the nail T in a single fitting operation if the shape or aspect ratio of the nail T is similar to that of a typical nail T and the longitudinal and transverse lengths of the nail design are within the modification threshold. This achieves ready and prompt fitting.

The above embodiments should not be construed to limit the present invention and may be appropriately modified within the gist of the present invention.

For example, in this embodiment, the size of the nail design D is based on that of a common model nail MT. Alternatively, the nail design D may not be limited thereto.

For example, nail designs of long and wide nails may be provided besides a nail design D based on a typical model nail MT.

In the case where the aspect ratio of the nail T acquired from the nail information detected in the nail-information detecting process indicates that the nail T is long or wide, the nail design suitable for the shape of the nail may preferentially appear on the display 26.

In such a case, the transformation of the nail design D for fitting can be minimized, and the nail design can be promptly printed on the nail T as imagined by the user.

Design fitting according to this embodiment is carried out through two schemes: 1) entering the second fitting mode for fitting and then switching to the first fitting mode for modification; and 2) entering the first fitting mode for fitting and then switching to the second fitting mode for modification. Alternatively, design fitting may be carried out in accordance with only one of the two schemes.

The nail design D can be fit to nails T having various shapes through either scheme.

In the embodiment described above, the image data on the nail design is stored in the memory 82. Alternatively, the image data on the nail design may be acquired from, for example, an external unit via the Internet.

In the embodiment described above, the drawing head 41 is of an inkjet type. Alternatively, the nail printer may include a drawing head including a pen holder holding a pen for drawing.

Alternatively, the nail printer may include both an inkjet drawing head and a drawing tool, such as a pen. In such a case, the inkjet drawing head and the drawing tool may be selected depending on the design to be drawn or use; for example, the pen may be used to apply a single base color, and the inkjet drawing head may be used to print fine patterns.

The embodiments described above should not be construed to limit the present invention, and the claims and other equivalents thereof are included in the scope of the invention.

The following statements are additional disclosure on the claims of the invention originally attached to application of the invention.

The claim numbers of the claims in this discloses are the same as those originally attached to application of the invention.

What is claimed is:

1. A drawing apparatus comprising:
a processor that determines an aspect ratio of a surface area of a target nail of a finger or a toe and enters a first fitting mode to modify an aspect ratio of a nail design among a plurality of nail designs in accordance with the aspect ratio of the surface area of the target nail and to fit the nail design to the surface area of the target nail, the plurality of nail designs including a first nail design and a second nail design that are different from each other,
wherein:
if the nail design is the first nail design, a rate of modification of the aspect ratio of the nail design is set to be within a first modification threshold that is stored in advance in association with the first nail design,
if the nail design is the second nail design, a rate of modification of the aspect ratio of the nail design is set to be within a second modification threshold that is stored in advance in association with the second nail design, the second modification threshold being different from the first modification threshold, and
the first modification threshold and the second modification threshold are both greater than 0%.

2. The drawing apparatus according to claim 1, wherein the processor enters the first fitting mode to transform a longitudinal length of the nail design to match a longitudinal length of the surface area of the target nail and a transverse length of the nail design to match a transverse length of the surface area of the target nail and compress or expand one of the longitudinal length and the transverse length of the nail design by a rate of modification within the first modification threshold if the nail design is the first nail design, or by a rate of modification within the second modification threshold if the nail design is the second nail design.

3. The drawing apparatus according to claim 2, wherein the processor enters a second fitting mode for modification of a size of the nail design without modification of the aspect ratio of the nail design to transform the nail design so as to match the other of the longitudinal length and transverse length of the nail design to the other of the longitudinal length and the transverse length of the surface area of the target nail in accordance with the aspect ratio of the surface area of the target nail, and enters the first fitting mode to compress or expand the one of the longitudinal length and the transverse length of the nail design by a rate of modification within the first modification threshold if the nail design is the first nail design, or by a rate of modification within the second modification threshold if the nail design is the second nail design.

4. The drawing apparatus according to claim 1, further comprising:
a memory storing the plurality of nail designs comprising information on respective corresponding modification thresholds including the first modification threshold and the second modification threshold,
wherein the processor enters the first fitting mode to select the rate of modification of the aspect ratio of the nail design within the corresponding modification threshold stored in the memory.

5. The drawing apparatus according to claim 1, wherein the plurality of nail designs are classified into several groups depending on a susceptibility of feeling to compression and expansion, and a corresponding modification threshold is selected for each group.

6. A non-transitory readable recording medium storing a program for causing a processor of a drawing apparatus to execute the processes of:
determining an aspect ratio of a surface area of a target nail of a hand or a foot; and
entering a first fitting mode to modify an aspect ratio of a nail design among a plurality of nail designs in accordance with the aspect ratio of the surface area of the target nail and fit the nail design to the surface area of the target nail, the plurality of nail designs including a first nail design and a second nail design that are different from each other,
wherein:
if the nail design is the first nail design, a rate of modification of the aspect ratio of the nail design is set to be within a first modification threshold that is stored in advance in association with the first nail design,
if the nail design is the second nail design, a rate of modification of the aspect ratio of the nail design is set to be within a second modification threshold that is stored in advance in association with the second nail design, the second modification threshold being different from the first modification threshold, and
the first modification threshold and the second modification threshold are both greater than 0%.

7. The drawing apparatus according to claim 1, wherein the first nail design is a design in which a line is drawn at a tip of a nail or a design of a gradation of several colors.

8. The drawing apparatus according to claim 1, wherein the second nail design is a design including a face of a character.

9. The drawing apparatus according to claim 1, wherein the first modification threshold is higher than the second modification threshold.

10. The drawing apparatus according to claim 1, wherein the first modification threshold is 30%.

11. The drawing apparatus according to claim 1, wherein the second modification threshold is 5%.

* * * * *